Figure 1:
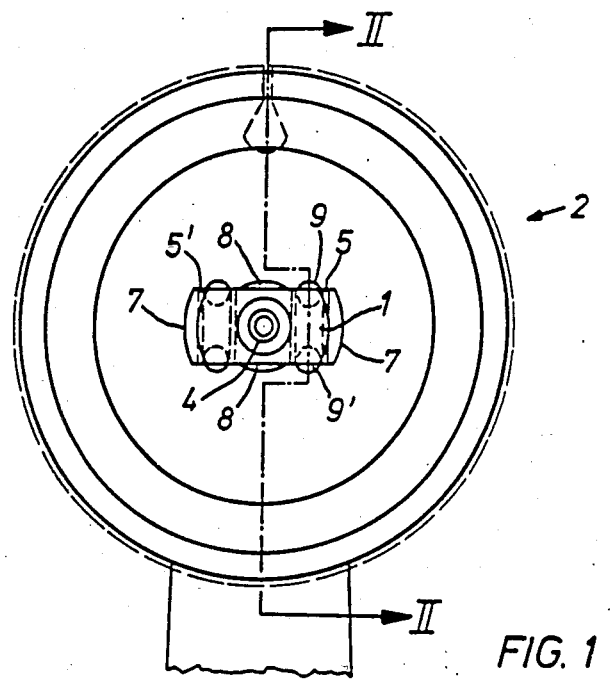

United States Patent [19]

Birkmann et al.

[11] Patent Number: 4,805,848
[45] Date of Patent: Feb. 21, 1989

[54] CLAMPING DEVICE FOR THE HUBS OF REELS OF MAGNETIC TAPE

[75] Inventors: Josef Birkmann, Fuerstenfeldbruck; José Toral, Munich, both of Fed. Rep. of Germany

[73] Assignee: Agfa-Gevaert Aktiengesellschaft, Leverkusen, Fed. Rep. of Germany

[21] Appl. No.: 56,115

[22] Filed: Jun. 1, 1987

[30] Foreign Application Priority Data

Jun. 12, 1986 [DE] Fed. Rep. of Germany ... 8615786[U]

[51] Int. Cl.⁴ .................. B65H 18/04; B65H 16/04
[52] U.S. Cl. ................................................. 242/68.3
[58] Field of Search .............. 242/68.3, 68, 68.1, 242/72 R, 72.1; 279/2 R; 269/48.1–48.4

[56] References Cited

U.S. PATENT DOCUMENTS

| | | | |
|---|---|---|---|
| 2,709,051 | 5/1955 | Bunch | 242/68.3 |
| 3,245,631 | 4/1966 | Pitts | 242/68.3 |
| 3,545,695 | 12/1970 | Patton | 242/68.3 |
| 3,857,526 | 12/1974 | Dischert | 242/68.3 |
| 3,946,962 | 3/1976 | Deletzke, Jr. | 242/68.3 |
| 4,432,506 | 2/1984 | Bingaman | 242/68.3 |

FOREIGN PATENT DOCUMENTS 2240637 3/1975 France.

*Primary Examiner*—Stuart S. Levy
*Assistant Examiner*—Steven M. DuBois
*Attorney, Agent, or Firm*—Connolly & Hutz

[57] ABSTRACT

A clamping device for hubs for winding magnetic tapes consists of a rotatably mounted block (1) mounted on a circular disc (2), the external circumference of which block is adapted to the internal bore of the winding core (6), said block containing, as clamping elements, two bushings (5,5′) situated opposite each other, each of which bushings has two balls (9,9′) which bear on the outside against the collar of the respective bushing (5,5′) and on the inside against each other by way of a spring (10), the clamping elements being situated at some distance from the circular disc (2) so that the reel hub (6) mounted in position bears against the portion of the ball projecting from the collar of the bushing (5,5′) and the bent over edge of the reel hub (6) is pressed by this spherical portion against the abutment (11) formed by the outer circumference of the circular disc (2).

4 Claims, 1 Drawing Sheet

U.S. Patent

Feb. 21, 1989

4,805,848

CLAMPING DEVICE FOR THE HUBS OF REELS OF MAGNETIC TAPE

The innovation relates to a clamping device for the hubs of reels of magnetic tape on separating and rewinding machines in which the internal core of the hub is dimensioned to conform to the clamping device.

In separating machines for magnetic tapes, a relatively wide web of film is separated into several narrow strips and wound up into rolls on individual winding hubs. In contact winding machines, winding arms equipped with clamping devices for holding and fixing the reel hubs are pivotally mounted on a winding shaft. These devices may be operated by various means, for example by magnetically or hydraulically produced contact pressure or by means of locking pawls or by a rotating device which locks into position and fixes the hub on a holder. In the latter case, the hub is released by unlocking the holder by turning back the disc.

Since the mounting of reel hubs on the separating machines, which is a manual operation, has to be carried out frequently during the manufacture of the magnetic tapes, an excessive amount of time and labour is required to operate these holders. It is also known in the prior art to use balls for connecting the reel hubs to the holder on magnetic tape apparatus. These balls are seated in special bores and are pushed outwards by means of a push button. However, in order to lift off the reel hubs, the push button must be continuously pressed down by means of a manual operating device which is mounted concentrically to the axis of rotation. DE-GM No. 78 14 447 discloses a clamping device for reel hubs with spring loaded clamping elements but this device can only be used for special reel hubs, namely so-called NAB hubs or winding hubs according to U.S. Pat. No. 4,081,151.

It is an object of the present innovation to provide a clamping device which facilitates the mounting of reel hubs in which the external surface of a block in the clamping device fits into the internal bore of a hub, on separating machines and rewinding devices and in particular enables the hubs to be rapidly replaced. According to the innovation, the clamping device for hubs for winding magnetic tapes comprises a rotatably mounted block (1) mounted on a circular disc (2). The external circumference of this block fits into the internal bore of the core (6) and the block contains clamping elements consisting of two bushings (5,5') situated opposite one another, each of which contains two balls (9,9') which bear on the outside against the collar of the bushing (5,5') in which they are seated and on the inside bear against each other through a spring (10). These clamping elements are situated at some distance from the circular disc (2), and the hub (6) mounted in position bears against the portion of sphere projecting from the collar of the bushing (5,5'), and this spherical portion presses the folded over edge of the hub (6) against the abutment (11) which is formed by the outer circumference of the circular disc (2).

Details of the innovation are apparent from the subclaims, the description and the drawings.

Figure 2:
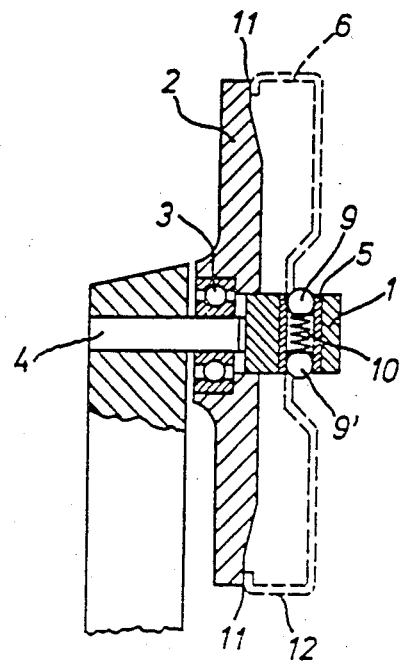

The innovation will now be described in more detail with reference to the drawings, in which FIG. 1 is a top plan view of the clamping device and FIG. 2 is a cross-section through the clamping device taken on the line II of FIG. 1 with the reel hub mounted thereon.

The clamping device according to the innovation consists of a block (1) seated on a circular disc (2) and having an axial bore to receive a bearing (3), the entire holder being rotatably mounted on the shaft (4). The peripheral surfaces of the block (1) conform to the internal surface of the bore of the reel hub (6) so that the hub is centrally seated on the block (1). According to this innovation, the circular cylindrical lateral surfaces (7) and central surface (8) of the block (1) may be tapered towards the front edge so that when the reel hub is placed into position the surface forms a sort of guiding slope with some clearance so that the hub can easily be placed into position even if it is tilted.

The clamping device as such consists of two cylindrical bushings (5,5') anchored in bores of the block (1) perpendicularly to the long side on either side of the central shaft (4). The bushings (5,5') contain each two balls (9,9') which are pressed against the outer collar of the bushing (5) by a spring (10). The bushings (5,5') are situated at some distance from the circular disc (2) so that the outer edge of the hub (6) bears against the spherical portion of the ball projecting from the bushing (5) and presses the bent over edge of the hub (6) against the abutment (11) formed by the outer circumference of the circular disc (2). This annular portion of the circular disc (2) is preferably thinner than the inner part of the disc, as shown in FIG. 2. The reel of magnetic tape is wound on to the external surface (12) of the hub (6), preferably without a flange.

The arrangement described above provides a technically simple and secure means of fixing the hubs of reels on the separating and rewinding device. Since the reel hubs require to be changed by hand and at frequent intervals, the clamping device according to the innovation contributes to the ease of operation at the workplace.

We claim:

1. A clamping device for mounting reel hubs on tape processing machines comprising a block mounted on a disc and rotatable around a central shaft as an axis of rotation,
    a pair of bushings in said block symmetrically arranged with relation to the axis and spaced apart adjacent opposite ends of said block,
    each bushing having opposing restrictive collars and containing two balls and a spring centrally located in the bushing seated against the respective balls in said bushing to urge each ball to bear on one of the collars of the bushing,
    the bushings being axially spaced from the disc,
    the external circumference of the block being so constructed and arranged that the internal bore of a hub is engageable on the block and against spherical surfaces of the balls whereby the hub may be subjected to a symmetrically divided force pressing an edge of the hub against the disc.

2. The clamping device of claim 4, further comprising, circumferential surfaces of the block partly tapered conically towards the front edge.

3. In a combination with a reel hub a block mounted on a disc and rotatable around a central shaft as an axis of rotation and having the reel hub attached to the block,
    a pair of bushings in said block symmetrically arranged with relation to the axis and adjacent opposite ends of said block,
    each bushing having opposing restrictive collars and containing two balls and a spring centrally located in the bushing seated against the respective balls in said bushing to urge each ball to bear on one of the collars of the bushing, the bushings being axially spaced from the disc, the external circumference of the block and an internal bore of the hub being so constructed and arranged that the internal bore bears against spherical surfaces of the balls and an edge of the hub presses against the disc.

4. In the combination as claimed in claim 3, the material of the disc is reduced in thickness at the outer circumference, said outer circumference serving as abutment for a bent over edge of the reel hub.

* * * * *